Sept. 21, 1943. J. S. KAHN 2,330,176
DISPENSER
Filed March 12, 1940 2 Sheets-Sheet 1
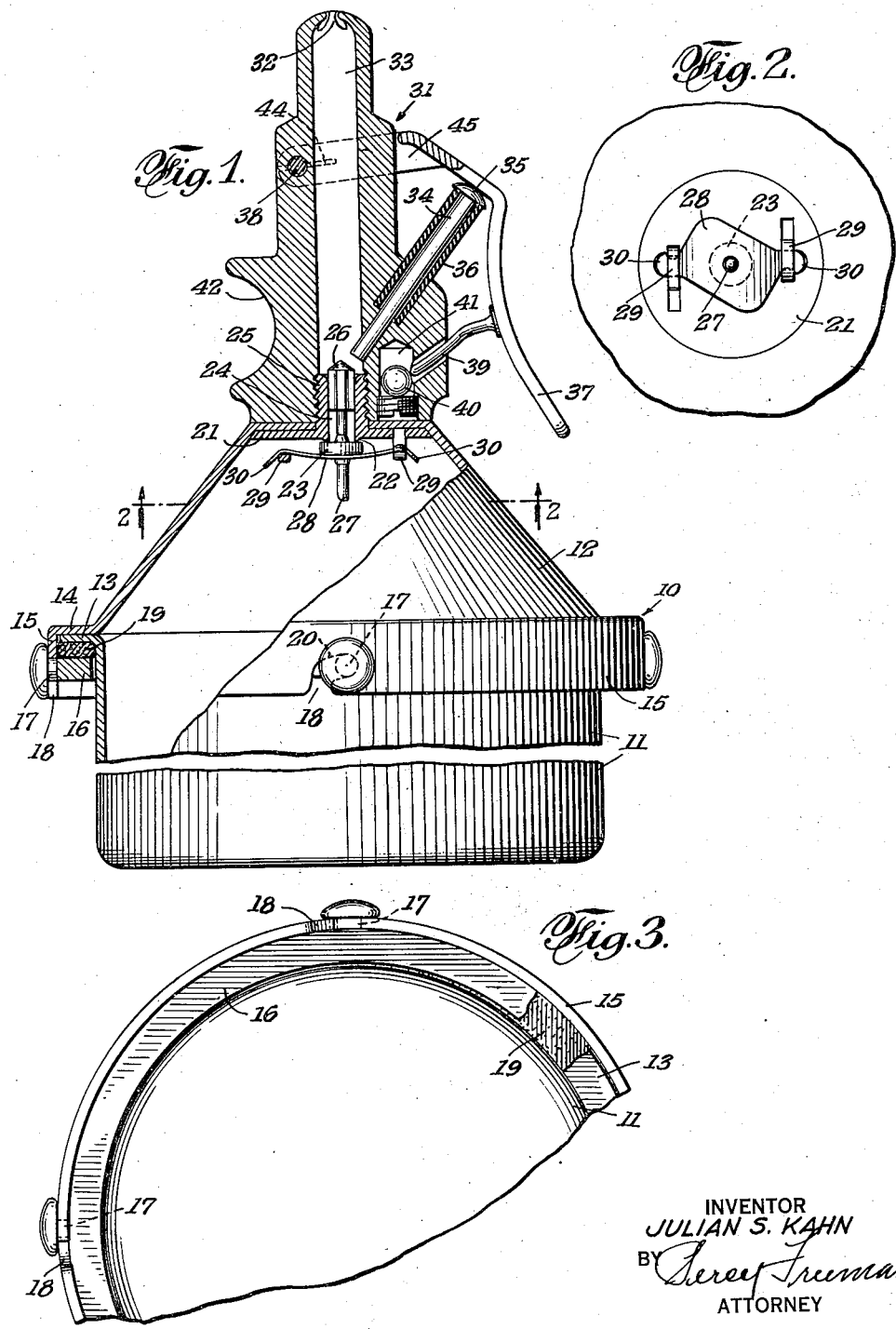
INVENTOR
JULIAN S. KAHN
BY
ATTORNEY

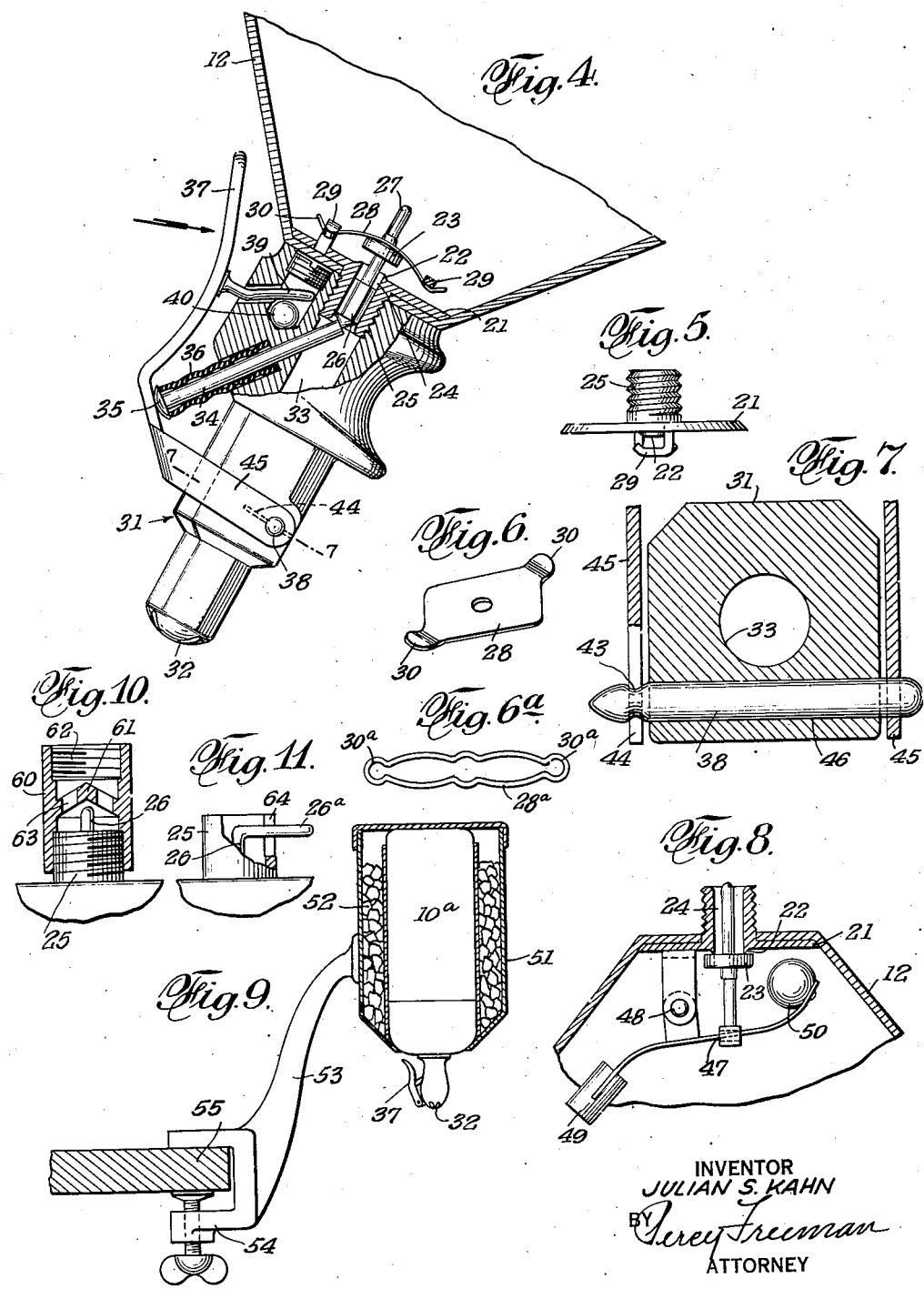

Patented Sept. 21, 1943

2,330,176

UNITED STATES PATENT OFFICE 2,330,176

DISPENSER

Julian S. Kahn, New York, N. Y.

Application March 12, 1940, Serial No. 323,521

7 Claims. (Cl. 221—74)

This invention relates to liquid dispensers and more particularly to dispensers for liquids under pressure.

The making of whipped cream and like substances by using a gas, has achieved great vogue. It becomes increasingly necessary, therefore, to provide simple, easily cleaned, and inexpensive means for dispensing such products.

The present invention, therefore, contemplates the provision of a container having a normally closed valve, and into which may be placed a quantity of sweet cream charged with nitrous oxide or other gas or combination of gases, at a desired pressure; and which is provided with a dispensing nozzle for the whipped cream formed by these ingredients.

An object of the invention resides in the provision of a two-part container, for this purpose, to facilitate the introduction of the sweet cream and in which novel sealing means between the container parts, is incorporated.

Another object of the invention is to provide a valve in a container of the above type which may be quickly disassembled for cleaning and as quickly assembled, which closes readily under the urge of a spring or weight, and requires little power to be opened against the pressure in the container. The means employed for closing the valve also forms an important feature of this invention.

The invention has for another object the provision of novel means for unseating the valve so that material may pass through a dispensing nozzle. This feature also incorporates novel means for sealing the valve-engaging means.

A further object of the invention resides in the provision in a container packed under gas pressure, of means whereby the valve may be unseated only in the dispensing position of the container and nozzle to obviate inadvertent ejection of the contents of said container.

While the invention is particularly adapted for dispensing whipped cream, it may be employed to spray paints, lacquers, and perfumes under pressure. The contemplated structures may also be used for dispensing liquids as milk and the like, which are not packed under pressure; an important characteristic of the invention being the ease with which the various parts of the structures may be disassembled for thorough cleaning after use.

The foregoing and many other objects, features and advantages of the invention will become more clearly apparent from the following detailed specification which is based on the accompanying drawings, in which are illustrated the features of the invention as at present conceived, and in which:

Fig. 1 is an elevational view partly broken away and partly in vertical section, of a dispenser constructed in accordance with this invention.

Fig. 2 is a plan sectional view as taken on the line 2—2 of Fig. 1.

Fig. 3 is a broken plan view of the container as viewed from the bottom thereof.

Fig. 4 illustrates the upper portion of the dispenser in partial section and partial elevation in its dispensing position.

Fig. 5 is a side elevational view of a valve seat member employed in the structure.

Fig. 6 is a perspective view of a spring member for maintaining the valve of the device in seated condition.

Fig. 6a is a plan view of an alternate form of spring member.

Fig. 7 is an enlarged cross-sectional view as taken in the plane of the line 7—7 of Fig. 4.

Fig. 8 is a fragmentary vertical sectional view of the upper portion of the container and showing an alternate form of valve-closing means.

Fig. 9 is a vertical sectional view to a reduced scale and illustrating a novel manner of mounting a dispenser as herein contemplated.

Figs. 10 and 11 are fragmentary side views partly in cross-section of modified forms of valve operating means.

In that embodiment of the invention which is illustrated in Figs. 1-7 inclusive, a container generally designated 10 is provided and is preferably formed of a lower portion 11 and an upper portion 12. The lower portion is preferably formed at its upper end with an outwardly directed flange 13 and the upper portion with a coacting flange 14 formed with a skirt portion 15.

The container member 11 is adapted to receive a liquid such as sweet cream before application thereto of the upper container member 12. After the container has thus been filled to a suitable level, the two container members are locked to each other as by means of a locking ring 16. This ring is formed with a plurality of pins or studs 17 arranged for association in bayonet slots 18 formed in the skirt 15 of the upper container member 12. Between the ring 16 and the flange 13 there is first positioned a compressible gasket 19 which is placed under initial pressure when the ring 16 is engaged in the bayonet slots 18, which for this purpose are angled to form cam surfaces 20. It will be noted that thus assembled the gasket 19 is out of contact with the contents of the container.

The upper container member 12 may have integrally formed therewith or on the valve member 21 thereof, a valve seat 22. This seat is preferably centrally arranged of the container and a valve 23 positioned to coact with said seat to seal the interior of the container from the valve passage 24 formed in the threaded extension 25 of said valve member 21. The valve 23 is preferably formed with a valve stem 26 arranged in the passage 24 and with an oppositely disposed pilot stem 27.

The valve 23 is held in position against its seat as by the substantially flat spring member 28 apertured for passage therethrough of the pilot stem 27 and arranged to urge the valve 23 against its seat. This spring member is preferably arranged in suspended relation between lugs such as 29 which may be formed from the material of the valve part 21. These lugs 29 are preferably designed in the form of hooks arranged oppositely to each other so that the ears 30 of the spring member 28 may be rotated around the pilot stem 27 into engagement therewith in a quick and easy manner and to be as easily disassembled from such engagement. The ears 30 are each preferably outwardly bent for a formal sitting association with the hooks 29.

The container 10 fitted with the valve means above described, and partially filled with a quantity of sweet cream may have introduced into the interior thereof and through the passage 24 a suitable amount of nitrous oxide or other suitable gas which when discharged with the sweet cream, forms whipped cream which is to be dispensed from the device. In this filled condition, the container is ready for distribution to the user or as illustrated, may be provided with a dispensing head generally designated 31.

While the spring member 28 is preferably made of flat spring stock, it may be conceivably made of wire as shown in Fig. 6a. In this case the ears 30 would be replaced by eyes 30a adapted to snap onto studs in place of the hooks 29, and the flat body replaced by bowed arms 28a so that arching of said member under pressure against the valve stem, would entail straightening of the bowed arms in a plane transverse that in which the member is arched.

In a preferred form, this head comprises a nozzle 32 and is formed with a passage 33, the lower portion of which is threadedly engaged with the thread stud 25 of the valve part 21. In this manner the passage 33 forms an extension of the passage 24, and when the valve 23 is unseated, the material in the container may pass through these passages and through the dispensing nozzle under urgency of the pressure within the container.

A preferred manner of unseating the valve is illustrated and comprises a preferably angularly disposed valve-operating pin 34 formed with a head 35 and sealed as by means of the sleeve 36 of rubber or like material. This sleeve also serves as spring means for holding the pin 34 out of operating engagement with the valve stem 26 until said pin is depressed as by means of the operating handle 37 pivoted to the head 31 as on the pintle 38.

In the position of the container shown in Fig. 1, the valve 23 may not be unseated because of the interfering relation between the pin 39 carried by the handle 37 and the ball 40 or like member gravitationally movable in the cavity 41 provided in the head. When dispensing of the contents of the container is desired, the container is positioned as shown in Fig. 4, so that the ball 40 may fall to a position out of the path of movement of the pin 39. Upon depression of the handle 37 in the direction of the arrow, the pin 34 engages the valve stem 26 to unseat the valve 23, flexing the spring 28 in its movement. There is now afforded a free passage of the material in the container through the passages 24 and 33 and through the nozzle 32. When pressure on the handle 37 is released, the spring 28 will restore the valve 23 to its seated condition, and the tube 36 will cause the pin 34 to follow and maintain contact of its head 35 with said operating handle. When the container is restored to the position shown in Fig. 1, the contents thereof may not be inadvertantly dispensed because of the restored interfering relation between the pin 39 and the ball 40. It will be noted that the tube 36, being under compression serves to seal the passage in which the pin 34 operates against seepage of the material at this point. A convenient gripping portion on the head is provided by forming the hollow 42 therein for engagement by the fingers of the hand.

An important feature of the device is that the parts may be disassembled for thorough cleaning in an expeditious manner. The manner of disassembling the valve has already been disclosed, and in order to remove the operating handle 37 so that the pin 34 and tube 36 may be cleaned, the pintle 38 is preferably grooved as at 43 and engaged with the bifurcated end 44 of one of the arms 45 of the operating handle. Thus, this pin may be pressed out of its bearing 46, and the handle and the mentioned tube and pin removed for thorough cleaning of these parts.

As shown in Fig. 8, the valve 23 may be held against its seat as by means of a lever 47 pivoted at 48 and provided with a weight 49 at one end and a float member 50 at the other. Either or both of the latter two members may be used. In the position shown, the weight and the float member will cause the valve 23 to engage against its seat 22 and thus seal the interior of the container. When the container is inverted as to the position shown in Fig. 4, the weight and float will act to unseat the valve so that the contents may be dispensed through the passage 24.

As shown in Fig. 9, the container now designated 10a may be mounted in a receptacle 51 provided with suitable refrigeration, as shown at 52. The receptacle may be carried as by means of an arm 53 provided with a clamp 54 for engagement with a support such as a shelf, table top and the like. In this instance, the pin 39 and the ball 40 may be omitted since the container is always in dispensing position. Pressure on the handle 37 will dispense the material in the container through the nozzle 32.

The container 10 may be supplied containing liquid to be dispensed without the dispensing head 31 and the threaded extension 25 fitted with a cap 60 as shown in Fig. 10. This cap is preferably formed with a transverse wall 61 to protect the valve stem 26 against contact with anything which would inadvertently unseat the valve. When dispensing of the liquid in the container is desired, the cap 60 may be reversed to engage the threads 62 with the extension 25, in which case the wall 61 will serve to depress the valve stem 26 to unseat the valve in the container. The liquid may then exit through the openings 63 in the wall 61. The mentioned threads may, of course, be eliminated and the cap 60 held to the extension 25 by a slip fit. This form of the invention may best be employed where the valve is incorporated in a crown sealed container, the parts being inexpensive enough so they may be discarded with the container when emptied.

As shown in Fig. 11, the valve stem 26 may be formed with a lateral extension 26a which serves as a valve depressing handle when dispensing is desired. The extension 25 may be slotted as at 64 to guide this lateral extension which may be a separate manipulating handle.

The foregoing disclosure is to be regarded as descriptive and illustrative only, and not as restrictive or limitative of the invention, of which obviously many embodiments may be constructed including many modifications without departing from the general scope herein indicated and denoted in the appended claims.

What I claim as new and desire to secure by Letters Patent, is:

1. A dispenser of the character described comprising a container formed of a base section and a cover section, means for separably uniting said sections and for sealing the interior of said container, a valve seat provided in the cover section and surrounding an exit passage for material in said container, a valve cooperating with said seat, a flat spring member detachably carried by the cover member to hold said valve against the mentioned valve seat, and a dispensing head detachably mounted on said cover member and provided with manually operable members for unseating said valve against the pressure of the mentioned spring.

2. A dispenser of the character described comprising a container formed of a base section and a cover section, means for separably uniting said sections and for sealing the interior of said container, a valve seat provided in the cover section and surrounding an exit passage for material in said container, a valve cooperating with said seat, a flat spring member detachably carried by the cover member to hold said valve against the mentioned valve seat, and a dispensing head detachably mounted on said cover member and provided with manually operable members for unseating said valve against the pressure of the mentioned spring, said dispensing head including members cooperating to prevent actuation of the valve unseating members in the upright position of the dispenser.

3. In a dispenser of the character described, a container having a base section and a cover section, a valve seat in said cover section surrounding an exit passage for material in said container, a valve cooperating with said seat, a flat spring member detachably carried by the cover section to hold said valve against the mentioned valve seat, said spring being accessible from the underside of said cover for removal and replacement and a dispensing head engaged with said cover and provided with manually operable members for unseating said valve against the pressure of the mentioned spring.

4. In a dispenser of the character described, a container, a valve seat in said container surrounding an exit passage for material in said container, a valve cooperating with said seat, a flat spring member detachably carried by the container to hold said valve against the mentioned valve seat, and a dispensing head detachably engaged with said container and provided with manually operable members for unseating said valve against the pressure of the mentioned spring, said dispensing head including members cooperating to prevent actuation of the valve unseating members in the upright position of the dispenser.

5. In a dispenser, a container having an opening, a sealable closure therefor, a valve seat in said closure surrounding an exit passage for material in said container, a valve cooperating with said seat, a flat spring member detachably carried by the closure to hold said valve against the mentioned valve seat, said spring being accessible from the underside of said closure for removal and replacement and a dispensing head engaged with said closure and formed with a passage extending from the mentioned exit passage and terminating in a nozzle, and manually actuatable means carried by said head for unseating said valve against the pressure of the mentioned spring.

6. In a dispenser of the character described, a container, a valve seat in said container surrounding an exit passage for material in said container, a valve cooperating with said seat, a flat spring member detachably carried by the container to hold said valve against the mentioned valve seat, and a dispensing head detachably engaged with said container and formed with a passage extending from the mentioned exit passage and terminating in a nozzle, and manually actuatable means carried by said head for unseating said valve against the pressure of the mentioned spring, said head also being provided with means locking the actuatable means against movement in the upright position of the dispenser.

7. In a dispenser, a container having an opening and a sealable closure therefor, a valve seat in said closure surrounding an exit passage for material in said container, a valve cooperating with said seat for closing said passage, a flat spring member detachably carried by the dispenser to hold said valve against the valve seat, said spring being readily removable and replaceable upon separating the closure from the container proper, and a dispensing head engaged with said closure and formed with a passage extending from the mentioned exit passage and terminating in a nozzle, and manually actuatable means carried by said head for unseating said valve against the pressure of the mentioned spring.

JULIAN S. KAHN.